June 24, 1969  M. RATTUNDE  3,451,283

INFINITELY VARIABLE CONE PULLEY TRANSMISSION

Filed Aug. 16, 1967  Sheet 1 of 3

INVENTOR.
MANFRED RATTUNDE
BY

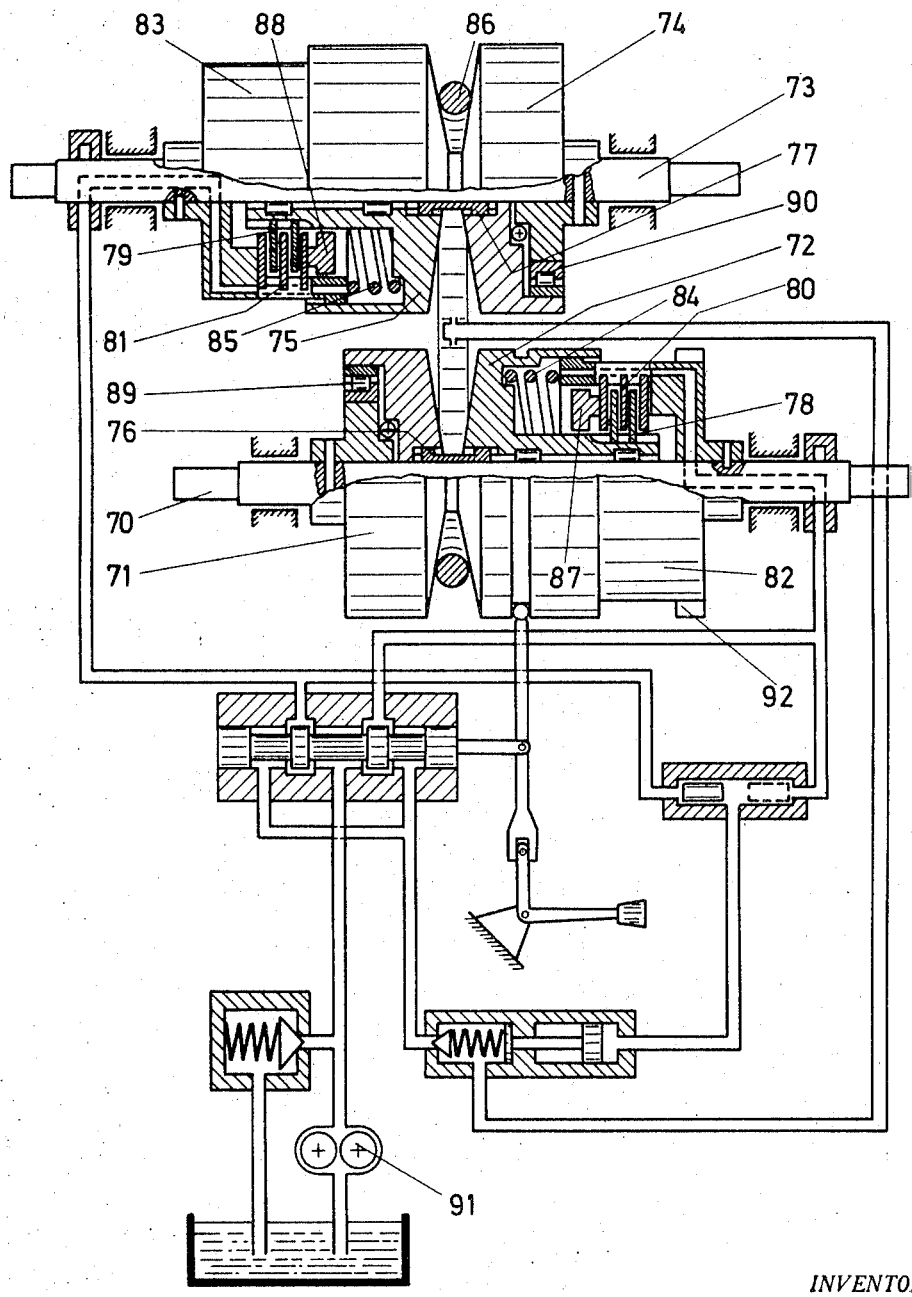

United States Patent Office 3,451,283
Patented June 24, 1969

3,451,283
INFINITELY VARIABLE CONE PULLEY
TRANSMISSION
Manfred Rattunde, Bad Homburg vor der Hohe, Germany, assignor to Reimers Getriebe A.G., Zug, Switzerland
Filed Aug. 16, 1967, Ser. No. 661,065
Int. Cl. F16h 55/56
U.S. Cl. 74—230.17
8 Claims

ABSTRACT OF THE DISCLOSURE

An infinitely variable cone pulley transmission wherein the axially movable conical disks of each pulley are pressed by hydraulic force against the belt or chain and this force is also controlled by hydraulic means.

Figure 1:
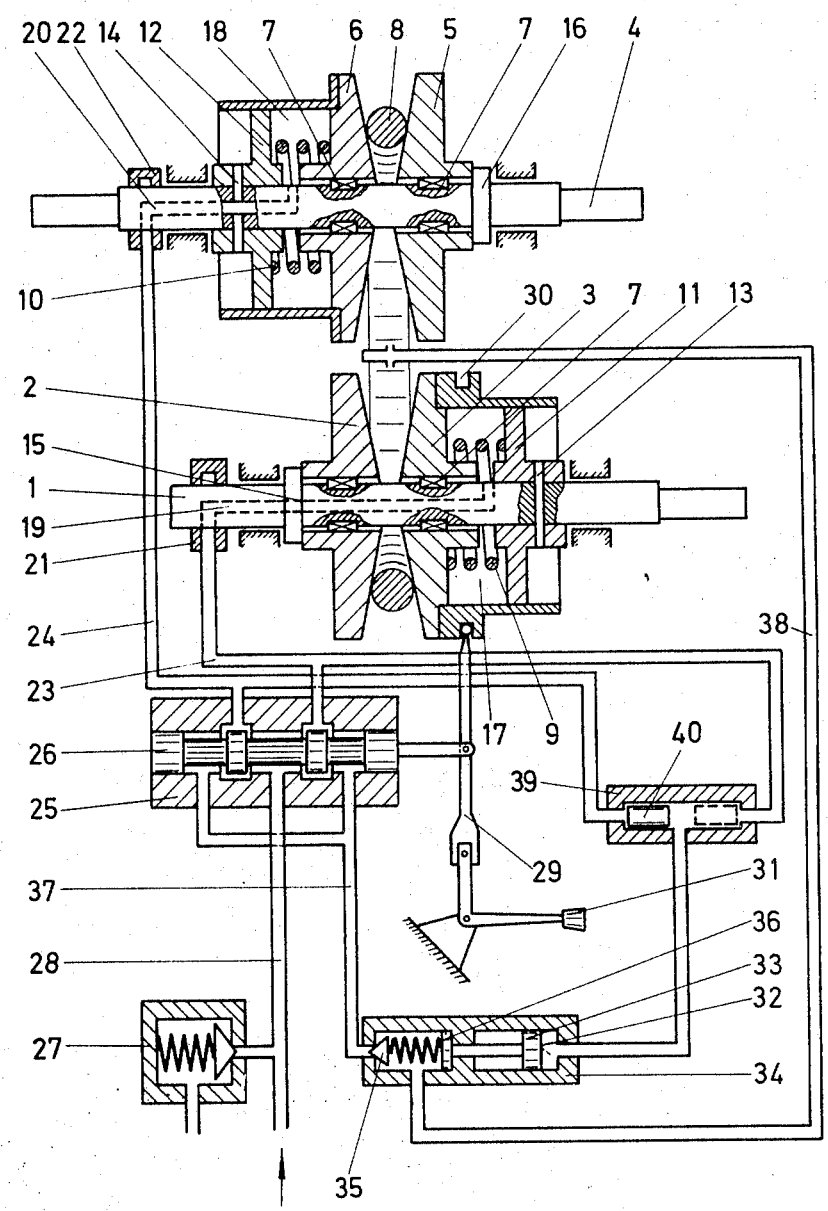

The prevent invention relates to an infinitely variable cone pulley transmission with at least one endless transmitting element in the form of a belt or chain running between two associated pairs of conical disks wherein at least one conical disk of each pair on the driving and driven sides of the transmission is slidable in its axial direction relative to the other disk and connected to a hydraulic cylinder in which the pressure is produced for applying these conical disks with the necessary contact pressure against the transmitting element by supplying this cylinder with a hydraulic pressure fluid, the pressure of which is dependent upon the load which is exerted upon the transmission and regulated by a distributing valve the slide member of which is pivotably connected to a two-armed lever one arm of which is connected to a control lever for arbitrarily changing the speed ratio of the transmission, while its other arm is adjustable by one of the axially movable conical disks for maintaining the speed ratio as manually set by this control lever.

There are infinitely variable cone pulley transmissions known of the type in which the contact pressures upon and by the conical disks which are required for maintaining and arbitrarily varying the speed ratio of the transmission are produced by a hydraulic pressure medium, while the contact pressures which are dependent upon the load and the speed ratio are produced by mechanical pressure means which are provided on each shaft in the form of a pressure ring which is axially slidable on but nonrotatably connected to the shaft and a front surface of which is provided with helical cam tracks which are operatively associated by means of intermediate rotatable elements with similar helical cam tracks on parts which are connected to the axially movable conical disk. The production of these contact pressure devices is, however, very expensive especially because of the difficulty of making the cam tracks with a varying pitch angle and they also have the disadvantage of permitting the speed ratio of the transmission to be adjusted only within a limited range. Furthermore, when such transmissions are started, or when their direction of rotation or the direction of torque is reversed or when the torques to be transmitted suddenly change in size, excessive load impacts will occur which are caused by the unavoidable play between the parts of those contact pressure devices and also by the fact that at a reversal of the direction of torque acting upon the transmission the rotatable elements between the cam tracks will suddenly switch over from one to the other side of the cam tracks. These overload impacts may result in serious damage to the conical disks as well as to the endless transmitting element or may even cause the latter to be torn apart. In order to avoid such damage, it is necessary to provide such transmissions with special damping means which render these transmisisons still more expensive.

It is an object of the present invention to provide an infinitely variable cone pulley transmission which may be adjusted to a much higher speed ratio and eliminates the overload impacts as caused by mechanical contact pressure devices and is for this purpose designed so that such mechanical pressure devices for producing the load and speed-ratio responsive contact pressures may without disadvantage be entirely omitted and wherein the load-responsive contact pressures as well as the pressures which are required for maintaining and changing the speed ratio are produced independently of the mechanical means for driving the transmission by a common hydraulic system which also renders such a transmission much more simple and inexpensive than other transmissions of this type as previously devised.

This object is attained according to the invention by means of an infinitely variable cone pulley transmission of the type as described at the beginning in which the hydraulic pressure medium alone produces the load-responsive contact pressures on the driving and driven sides of the transmission and also the axial pressures which are required for maintaining and changing the speed radio. Another feature of the invention for attaining this object consists in designing the transmission so that the hydraulic pressure which acts upon the respective driving pair of conical disks also acts upon an adjustable control valve and that the excessive amounts of pressure oil which are conducted to the distributing valve are also passed under the pressure prevailing on the driven side of the transmission to this control valve and act upon a valve member of this valve so that this valve member will be lifted off its seat against the action of the hydraulic pressure prevailing on the driving side of the transmission and the excessive amounts of pressure oil may then flow off without pressure. For this purpose, the piston surface of the control valve which is acted upon by the hydraulic pressure of the driving side is made of such a size that the rate of changing of the ratio between the hydraulic pressures on the driven side and that on the driving side will always be smaller than the ratio of the changing pressures themselves.

Due to the fact that through the adjustable control valve the hydraulic pressure on the driving side affects the discharge of the excessive amounts of pressure oil which are supplied to the distributing valve under the hydraulic pressure prevailing on the driven side of the transmisison, an increase in the load upon the transmission and the resulting increase of the hydraulic pressure on the driving side will also cause an increase of the hydraulic pressure on the driven side. The control valve according to the invention therefore permits in an extremely simple manner the production of load-responsive contact pressures.

In order to insure that in such cases in which a reversal in the direction of power through the transmission may occur the hydraulic pressure at the driving side of the transmission will always act upon the piston of the control valve, it is advisable to insert a reversing valve into the line connecting the control valve with the hydraulic pressure of the driving side so that the hydraulic pressure of the driving side as well as of the driven side of the transmission will act upon this reversing valve. If therefore a reversal in the direction of torque occurs in the transmission and the formerly driven side becomes the driving side, this will result in an adjustment of the reversing valve in such a manner that the hydraulic pressure which is now that of the driving side will have access to and act upon the piston of the adjustable control valve. For limiting the hydraulic pressure on the prevailing driving side and for thus also limiting the power which may be transmitted by the transmission, it is possible to insert a pressure relief valve into the supply line of the hydraulic pressure fluid to the main control valve which line may be connected, for example, to a central source of supply. This pressure relief valve is adapted to limit the strength of the pressure of the hydraulic pressure fluid.

Another feature of the invention consists in the provision of suitable means in the form of torque overload friction clutches for balancing torque peaks in such a manner that the slipping torque is dependent upon the load to which the transmission may be subjected and upon its speed ratio. For this purpose the invention further provides that the hydraulic pressure which prevails at the respective driving side of the transmission is adapted to control the gripping force of the friction clutches which are mounted within the transmission and the slipping torque of which is proportional to the hydraulic pressure and smaller than the torque which may be transmitted on the driving side of the transmission between the conical disks and the endless transmitting element. According to one preferred embodiment of the invention, one part of the friction clutch may be mounted on the associated shaft of the transmission so as to be rotatable but axially immovable thereon, while the other part of the clutch forms a piston which is axially movable but nonrotatable on this shaft and is disposed within a rotatable hydraulic cylinder which is connected to the axially movable conical disk. The same result may, however, also be attained if one part of the clutch is rigidly connected to the associated shaft of the transmission, while the other part of the clutch is provided in the form of a piston which is mounted on this shaft so as to be rotatable but axially immovable thereon and disposed within a hydraulic cylinder which is connected to the axially movable conical disk. Since in such a transmission which is adapted to permit a reversal of the direction of torque and is therefore provided with a friction clutch on the driving side as well as on the driven side, the hydraulic pressure on the formerly driven side will not be sufficient to engage the elements of the clutch which are now on the driving side as tightly with each other as required, it is advisable to install on the drive shaft and on the driven shaft a freewheeling device in such a manner that on the driven side the torque will be transmitted by the freewheeling device by bypassing the friction clutch.

Finally, it is often desirable especially when a large machine is to be driven to devise the transmission so as not to transmit the full power to the machine immediately when being started. This may be attained by conveying the hydraulic pressure fluid by means of a pump which operates independently of its direction of rotation and is driven by the respective drive shaft of the transmission. The hydraulic pressure which engages the clutch will then only be built up slowly after the driving power has been started so that the driven machine will also be only gradually connected to the driving power and gradually accelerated.

Figure 2:
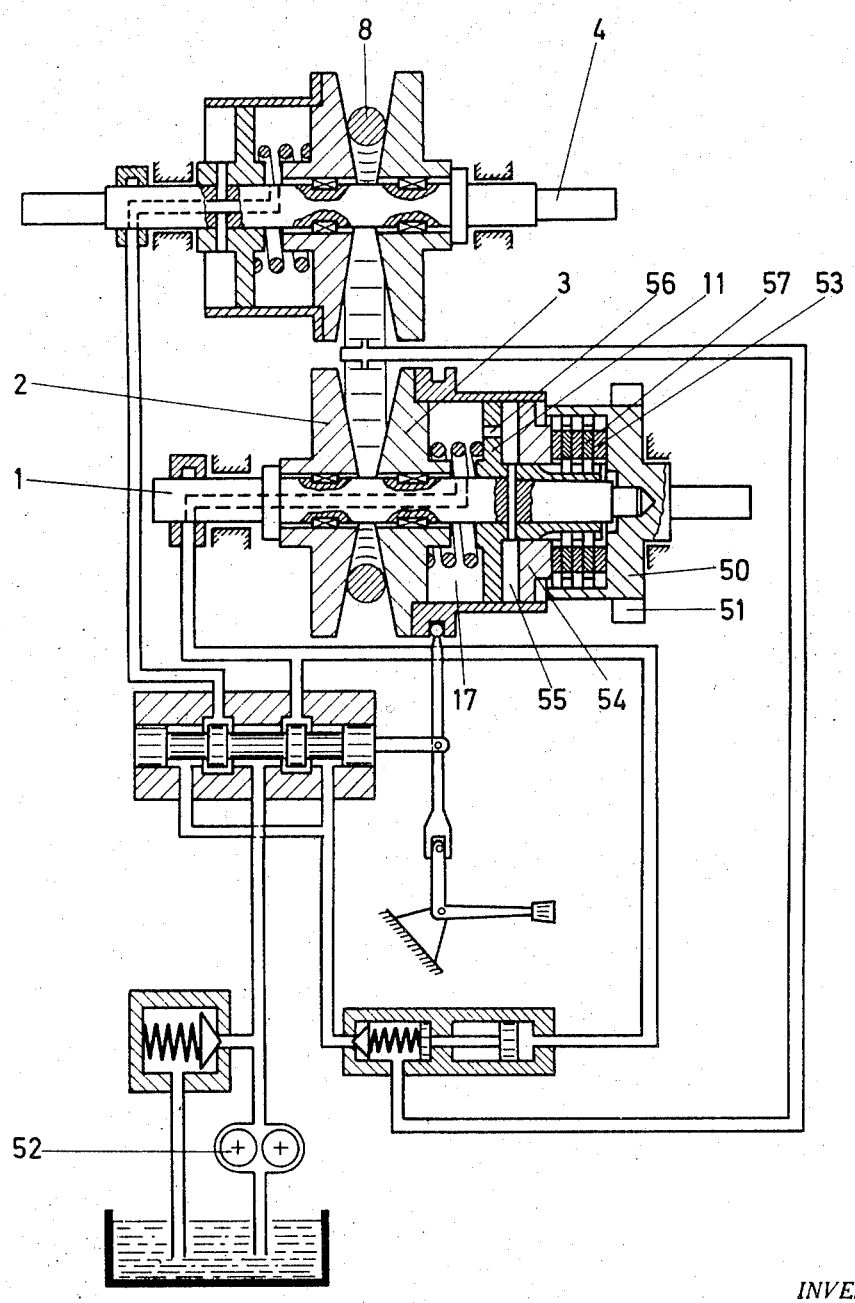

The features and advantages of the present invention will become more clearly apparent from the following detailed description thereof which is to be read with reference to the accompanying diagrammatic drawings, in which:

FIGURE 1 shows partly in section, an infinitely variable cone pulley transmission according to the invention in which the required contact pressures are produced solely by hydraulic means for transmitting positive as well as negative torques;

FIGURE 2 shows, largely in section, another infinitely variable cone pulley transmission according to the invention, in which the required contact pressures are likewise produced solely by hydraulic means and in which the driving side of the transmission is provided with a torque overload friction clutch for transmitting positive torques; while FIGURE 3 shows, partly in section, another infinitely variable cone pulley transmission according to the invention, in which the required contact pressures are likewise produced solely by hydraulic means and in which a torque overload friction clutch is provided on the driving side as well as on the driven side of the transmission for transmitting positive as well as negative torques.

The infinitely variable cone pulley transmission as illustrated in FIGURE 1 comprises a drive shaft 1 and a driven shaft 4, each of which carries a pair of conical disks 2 and 3 or 5 and 6, respectively, which are slidable thereon in the axial direction but are prevented by splines 7 from rotating relative to their respective shafts. The two pairs of disks 2, 3 and 5, 6 are connected to each other by an endless transmitting element 8 such as a belt or chain. The two conical disks 3 and 6 are designed so as to form rotary hydraulic cylinders and each of them is acted upon by a compression spring 9 or 10 one end of which acts upon the conical disk 3 or 6 so as to apply a certain initial pressure upon the transmitting element 8 even when the transmission is not in operation, while the other end of this spring 9 or 10 is supported on a piston 11 or 12 which is slidable within the respective cylinder and rigidly secured by a pin 13 or 14 to the drive shaft 1 or the driven shaft 4, respectively. The axial movement of the other conical disk 2 or 5 of each pair is limited by a flange 15 or 16 on shaft 1 or 4, respectively, or these disks may be rigidly secured to shafts 1 and 4.

The hydraulic chambers 17 and 18 between the conical disks 3 and 6 and pistons 11 and 12 communicate through axial bores 19 and 20 in shafts 1 and 4, oil channels 21 and 22, and pipe lines 23 and 24 with a common distributing valve 25 which is adapted to distribute the pressure oil coming through a supply line 28, for example, from a central source of supply to the hydraulic chamber 17 and 18 in accordance with the position to which the valve member 26 of this valve is adjusted. The supply line 28 may be connected to a pressure relief valve 27 which, in turn, is connected to the oil sump.

At the outside of valve 25, valve member 26 is pivotably connected to a two-armed lever 29, one end of which is slidable along an annular groove 30 in disk 3, while its other end is pivotably connected to a control lever 31. The hydraulic pressure acting at any time upon the driving pair of conical disks acts as a control valve upon the surface 32 of a piston 33 which is slidable within one chamber of an adjustable control valve 34 and is acted upon by spring 36 in another valve chamber which, in turn, acts upon a valve member 35. The control valve 34 is adapted to determine the hydraulic pressure which acts in the axial direction upon the pair of conical disks on the driven side of the transmission and is dependent upon the hydraulic pressure acting in the axial direction upon the conical disks on the driving side. This is due to the fact that the excessive amounts of pressure oil which are supplied to the distributing valve 25 will also be supplied under pressure prevailing at the respective driven side of the transmission through a return line 37 to the control valve 34 in which they will lift the valve member 35 off its seat against the action of spring 36 which is acted upon by the pressure of the respective driving side of the transmission. The excessive amounts of pressure oil may then flow off practically without pressure through the return line 38 to the oil sump or be sprayed upon the transmitting element 8 for lubricating the same. In order to avoid the pressures from being built up within the hydraulic control system, the surface 32 of piston 33 is made of such a size that the rate of changing the ratio between the hydraulic pressures on the driven side and that on the driving side should always be smaller than the ratio between the changing pressures themselves.

In order to insure that, when the direction of torque of the transmission is reversed, the hydraulic chamber of the respective driving pair of conical disks will always be in communication with the control valve 34, a reversing valve 39 is inserted between the pipe lines 23 and 24 which may consist, for example, of a free piston 40 which is adapted under the action of the hydraulic pressure of the respective driving side of the transmission to close the connection between the pipe line of the driven side and the control valve 34.

The mode of operation of the transmission as above described is as follows:

If the same oil pressure prevails in the hydraulic chambers 17 and 18 when the transmission is in one of the possible transmitting positions while standing still and shaft 1 is then driven and a load is exerted upon the transmission, the transmitting element 8 will according to well-known laws exert a greater spreading force upon the driving disks 2 and 3 than upon the driven disks 5 and 6. Consequently, the disk 3 will then be shifted slightly away from the transmitting element 8, while disk 6 will move accordingly toward the transmitting element 8. During this movement, disk 3 also takes along the two-armed lever 29, whereby the valve member 26 of the distributing valve 25 will be shifted so that the size of the inlet opening of the pipe line 23 will be increased and of the pipe line 24 will be reduced with the result that the oil pressure will increase in the hydraulic chamber 17. This increasing oil pressure at the driving side of the transmission also acts upon the piston 33 of the control valve 34 so that its spring 36 will be compressed and its valve member 35 will therefore throttle the flow of oil passing through the return line 37 with the result that the hydraulic pressure in the chamber 18 at the driven side of the transmission will likewise increase at the ratio to the hydraulic pressure at the driving side as determined by the control valve 34. The axial movements of disks 3 and 6 will be terminated when the contact pressures which are exerted by the two pairs of disks upon the transmitting element 8 will be equal to the spreading forces which are exerted upon the the disks by the transmitting element in accordance with the torque to be transmitted. These axial movements of the conical disks and of valve member 26 are very small since even a very small movement of this valve movement will already result in an extremely strong increase in pressure.

The procedures as above described will occur in the same manner when the torque increases which is to be transmitted by the transmission and thus also the spreading forces increase which are exerted by the driving element 8 upon the conical disks. However, when the torque and the spreading forces decrease, the direction of the movements of disks 3 and 6, slide valve 26, and piston 33 of the control valve 34 will be reversed in the order of succession as described.

The infinitely variable adjustment of the speed ratio may be carried out manually by means of the control lever 31. If this lever is pivoted, for example, in the clockwise direction as seen in FIGURE 1, valve member 26 will be moved so that the cross-sectional size of the passage from the supply line 28 to the pipe line 23 will be increased, while that from the supply line 28 to the pipe line 24 will be reduced. Consequently, the hydraulic pressure in the hydraulic chamber 17 will be increased and the conical disks 2 and 3 will be moved toward each other on the drive shaft 1 and will thereby increase the radius of the transmitting element 8 between them, while the corresponding reduction of the radius of the transmitting element 8 between the disks 5 and 6 on the driven shaft 4 will cause the distance between these disks to be increased. The speed ratio of the transmission will thus be changed in such a manner that the speed of the driven shaft 4 will increase relative to the speed of the drive shaft 1 which is assumed to be constant. This adjusting operation will be completed when the speed ratio as set by the control lever 31 is reached. This is due to the fact that valve member 26 will then be returned to its original position by the two-armed lever 29 the end of which engages into groove 30. In place of the control lever 31 it is also possible, for example, for the operation of a motor vehicle, to provide a centrifugal governor.

If the direction of torque is reversed which is transmitted by the transmission according to the invention so that the formerly driven shaft 4 becomes the driving shaft, the driving element 8 will exert a greater spreading force upon the conical disks 5 and 6 than upon the conical disks 2 and 3. However, since at this time there will still be a higher pressure in the hydraulic chamber 17 than in the hydraulic chamber 18, these changing spreading forces will cause the conical disk 6 to be moved slightly away from the driving element 8 and the conical disks 3 slightly toward the driving element. The conical disk 3 then takes along the two-armed lever 29 and thereby causes an adjustment of the valve member 26, which, in turn, results in an increase of the hydraulic pressure in chamber 18 and a reduction of the hydraulic pressure in chamber 17. When this reversal in pressure reaches the point in which the hydraulic pressure acting upon the conical disk 6 exceeds the pressure which acts upon the conical disks 3, the free piston 40 of the reversing valve 39 will be shifted to the position as indicated in FIGURE 1 in dotted lines so that the auxiliary valve 34 will then be connected to the pipe line 24 and thus to the hydraulic pressure prevailing in the driving side of the transmission. The axial displacement of the conical disks 3 and 6 which is caused by the reversal of the direction of forces as transmitted by the transmission will terminate after the hydraulic pressure has been sufficiently increased on the driving side and accordingly reduced on the driven side which occurs when the contact pressures which are exerted by the two pairs of conical disks upon the transmitting element 8 and the spreading forces which are exerted by the transmitting element 8 upon the conical disks balance each other.

FIGURE 2 illustrates another embodiment of an infinitely variable cone pulley transmission according to the invention. The description of the transmission as made above with references to FIGURE 1 also supplies substantially to the embodiment according to FIGURE 2, except for following alterations:

The transmission according to FIGURE 2 is only intended for transmitting positive torques so that shaft 1 always serves as a drive shaft and shaft 4 always as a driven shaft. A reversing valve therefore becomes unnecessary. On drive shaft 1 a bell-shaped clutch housing 50 is rotatably mounted which carries a gear rim 51 for driving an oil pump 52 which is capable of operating in either direction. Housing 50 is nonrotatably connected to the external clutch disks 53 with outer teeth which, however, are slidable in the axial direction within the housing 50. A clutch piston 54 is axially slidable along the hub of piston 11 so that an intermediate hydraulic chamber 55 is formed which communicates through a bore 56 in piston 11 directly with the hydraulic chamber 17 of the driving side of the transmission. Piston 11 further carries internal clutch disks 57 which are nonrotatably connected thereto but likewise slidable in the axial direction. When the drive shaft 1 of this transmission is started, the clutch housing 50 which is rigidly secured thereto will at first run idle until so much oil has been pumped by the oil pump 52 which is driven by gear rim 51 that the pressure in the hydraulic chamber 17 and that passed into chamber 55 through the bore 56 in piston 11 increase equally. This increasing pressure in the driving side of the transmission results in a displacement of the clutch piston 54 whereby the internal clutch disks 57 will be pressed against the external clutch disks 53 so that a frictional connection will then be formed between the clutch housing 50 and drive shaft 1 and through the transmitting element 8 with the driven shaft 4 with the result that the elements which are to be driven by the transmission will be progressively accelerated until the hydraulic pressure in the driving side of the transmission has reached its full value and the clutch will no longer slip.

In order to prevent any possible torque variations from fully acting upon the transmission which might result in damage or a destruction of the conical disks and the driving element 8, the friction clutch is designed so that the torque which is to be transmitted by it will always be smaller than the torque which may be transmitted on the driving side between the conical disks 2 and 3 and the driving element 8. Therefore, before the driving element 8 can slip, for example, at sudden torque variations, the clutch will slip which is not dangerous because of the relatively low surface pressures which will occur therein. On the other hand, this slipping torque of the clutch is proportional to the load to which the transmission may at any time be subjected since the hydraulic pressure which increases in the driving side, for example, when the load on the transmission increases, will also act upon the clutch piston 54 so that the clutch disks will be more firmly pressed against each other.

FIGURE 3 illustrates an infinitely variable cone pulley transmission according to the invention which is designed for positive and negative torques, in which therefore by a reversal of the direction of torque each pair of conical disks may act either as a driving pulley or as a driven pulley, when driving up and downhill with a motor vehicle. One shaft 70 carries a pair of conical disks 71 and 72 and another shaft 73 carries a pair of conical disks 74 and 75 which are rotatable and axially slidable on these shafts. The disks of each pair are, however, nonrotatably connected but axially slidable relative to each other by means of a gear bushing 76 or 77, respectively. The conical disks 72 and 75 carry axially movable internal clutch disks 78 and 79 which are disposed between external clutch disks 80 and 81 on bell-shaped clutch housings 82 and 83 which are rigidly secured to shafts 70 and 73, respectively. These clutch housings are acted upon by compression springs 84 and 85 which act upon the clutch disks 72 and 75 and hold the endless driving element 86 in a tight condition even when the transmission is not in operation. The hubs of the conical disks 72 and 75 have axially slidable thereon the clutch pistons 87 and 88 which under the hydraulic pressure prevailing in the hydraulic chambers between the conical disks 72 and 75 and the clutch housings 82 and 83 are applied against the set of external clutch disks and thus engage the clutch.

Clutch disks 71 and 74 may be nonrotatably connected to shafts 70 and 73 by freewheel elements 89 and 90 which are designed so as to carry out the power transmission between the conical disks and the associated shaft on the respective driven side of the transmission since the hydraulic pressure prevailing on the respective driven side is not sufficient to engage the clutch of this side as firmly as required. The hydraulic production of the load-responsive contact pressures of the conical disks and of the contact pressures which are required for maintaining and changing the speed ratio as set by the control lever occurs in this transmission in the same manner as described with reference to FIGURE 1 with the exception that the reversible pump 91 which is driven by a gear rim 92 on the clutch housing 82 will not convey the hydraulic pressure fluid until the drive of the transmission is started whereby the elements to be driven by the transmission in the manner as described with reference to FIGURE 2 will be gradually accelerated.

Having thus fully disclosed my invention, what I claim is:

1. An infinitely variable cone pulley transmission having a driving side and a driven side, a pair of shafts each associated with one of said sides, a pair of conical disks nonrotatably mounted on each shaft, at least one of said disks of each pair being slidable in the axial direction on its shaft, an endless transmitting element connecting and adapted to run between said two pairs of disks, a hydraulic cylinder connected to and rotatable with said axially movable disk on each shaft, supply means of a pressure fluid, a distributing valve, a line connecting said supply means to said distributing valve, conducting means connecting said distributing valve to each of said hydraulic cylinders for supplying said pressure fluid thereto so as to press said disks by hydraulic pressure against said transmitting element in accordance with the load acting upon said transmission, said hydraulic pressure being the sole controlled variable force acting on said disks, said distributing valve having an axially movable valve member, a two-armed lever pivotably connected between its arms to an outer end of said valve member, a control member connected to one arm of said lever for arbitrarily changing the speed ratio of said transmission, peripherally extending means on the axially movable disk of one of said pairs for pivotably connecting said disk to the other arm of said lever and thus also to said valve member for maintaining the speed ratio as set by said control member, a control valve comprising a housing having a first valve port and a second valve port, a piston slidable within said housing and a valve member connected to said piston adapted to open and close said first valve port, conducting means connecting said second valve port facing the end surface of said piston to said connecting means leading to said driving side so that said piston will be acted upon by the hydraulic pressure of said driving side, said housing having an outlet intermediate said piston and said valve member, conducting means connecting said first valve port to said distributing valve so that excessive amounts of said pressure fluid supplied to said distributing valve will also be conducted to said first port so as to act upon said valve member so as to open the same against the pressure on said driving side and to permit said excessive amounts to flow off through said outlet, said end surface of said piston having such a size that the rate of changing the ratio between the hydraulic pressure on the driven side and that on the driving side will always be smaller than the ratio of the changing pressures themselves.

2. A cone pulley transmission as defined in claim 1, further comprising a reversing valve in said conducting means connecting said control valve with the hydraulic pressure of said driving side, and conducting means connecting said reversing valve also to the hydraulic pressure of said driven side.

3. A cone pulley transmission as defined in claim 1, further comprising a pressure relief valve connected to said supply line leading to said distributing valve for limiting the pressure of said pressure fluid.

4. A cone pulley transmission as defined in claim 1, further comprising at least one torque overload friction clutch, said clutch being adapted to be acted upon by the hydraulic pressure acting upon the driving side of said transmission and to have a slipping torque proportional to said hydraulic pressure but smaller than the torque to be transmitted between said conical disks of said driving side and said transmitting element.

5. A cone pulley transmission as defined in claim 4, wherein said friction clutch comprises a hydraulic cylinder secured to and rotatable with said axially movable disk on said shaft of said driving side, and at least two clutch members adapted to engage frictionally with each other, one of said clutch members being rotatably mounted on but axially immovable relative to said shaft and the other clutch member forming a hydraulic piston nonrotatably connected to said shaft but axially slidable along said shaft and with said cylinder.

6. A cone pulley transmission as defined in claim 4, wherein said friction clutch comprises a hydraulic cylinder secured to and rotatable with said axially movable disk on said shaft of said driving side, and at least two clutch members adapted to engage frictionally with each other, one of said clutch members being rigidly secured to said shaft and the other clutch member forming a hydraulic piston rotatably mounted on said shaft and axially slidable along said shaft and within said cylinder.

7. A cone pulley transmission as defined in claim 4, further comprising freewheeling means on each of said shafts on said driving and driven sides designed so as to transmit the torque on the side serving as said driven side by bypassing said friction clutch on said driven side.

8. A cone pulley transmission as defined in claim 1, wherein said supply means comprise a rotary pump adapted to operate independently of its direction of rotation and to be driven by one of said shafts.

References Cited

UNITED STATES PATENTS

| | | | |
|---|---|---|---|
| 3,043,152 | 7/1962 | Karig et al. | 74—230.17 |
| 3,052,132 | 9/1962 | Dittrich et al. | 74—230.17 |
| 3,115,049 | 12/1963 | Moan | 74—230.17 XR |

FRED C. MATTERN, JR., *Primary Examiner.*

JAMES A. WONG, *Assistant Examiner.*